Aug. 2, 1932.  G. A. HUGHES  1,870,119
AIRPLANE
Filed Jan. 30, 1932   3 Sheets-Sheet 1

George A. Hughes,
INVENTOR

Aug. 2, 1932.   G. A. HUGHES   1,870,119
AIRPLANE
Filed Jan. 30, 1932   3 Sheets-Sheet 2
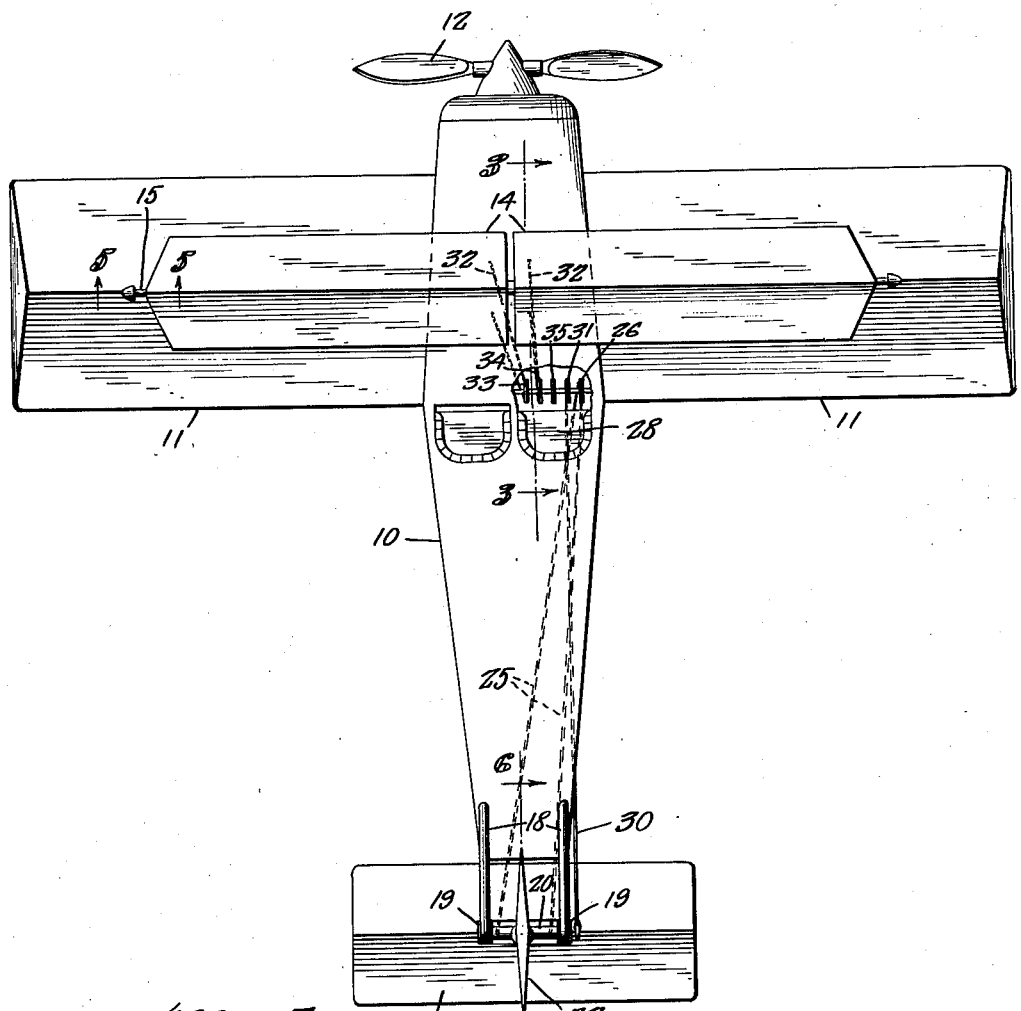
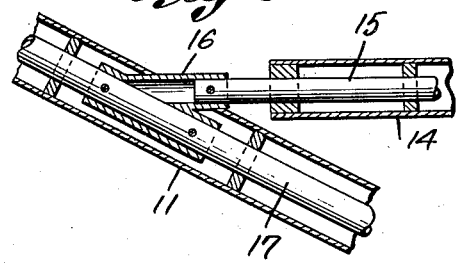
George A. Hughes,
INVENTOR Aug. 2, 1932.   G. A. HUGHES   1,870,119
AIRPLANE
Filed Jan. 30, 1932   3 Sheets-Sheet 3
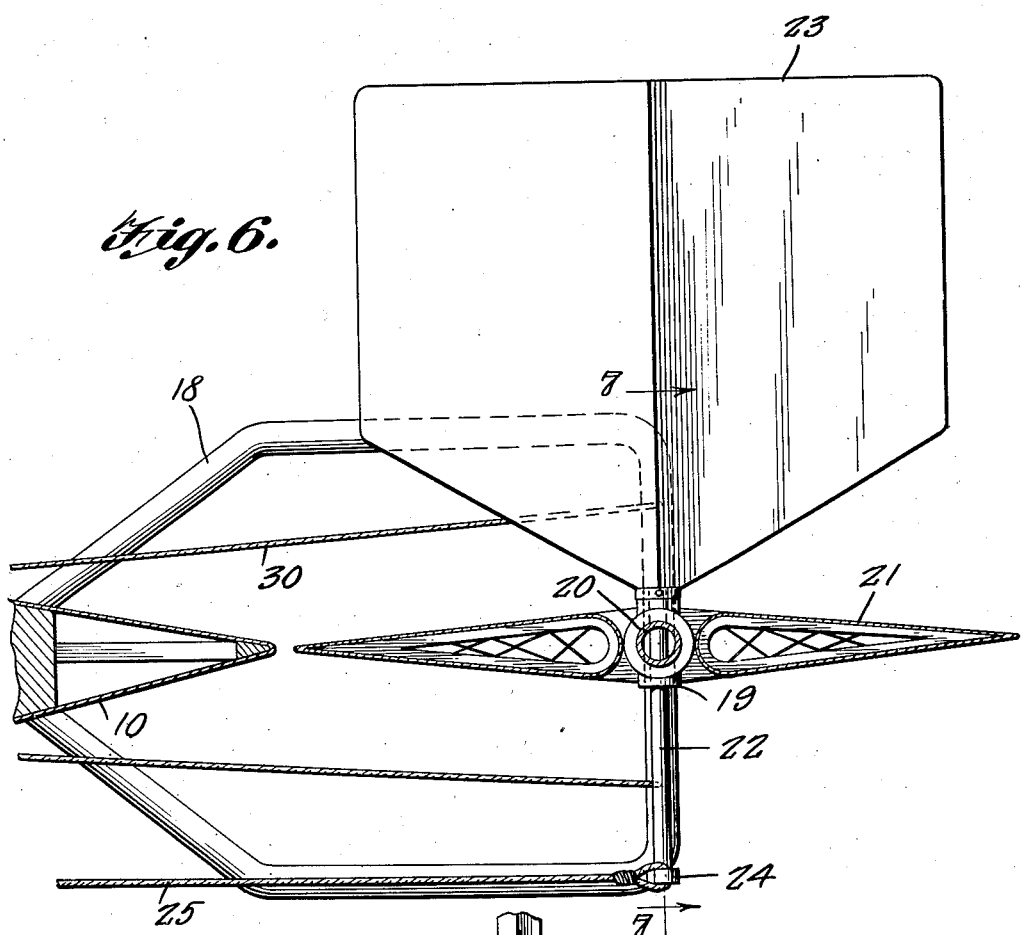
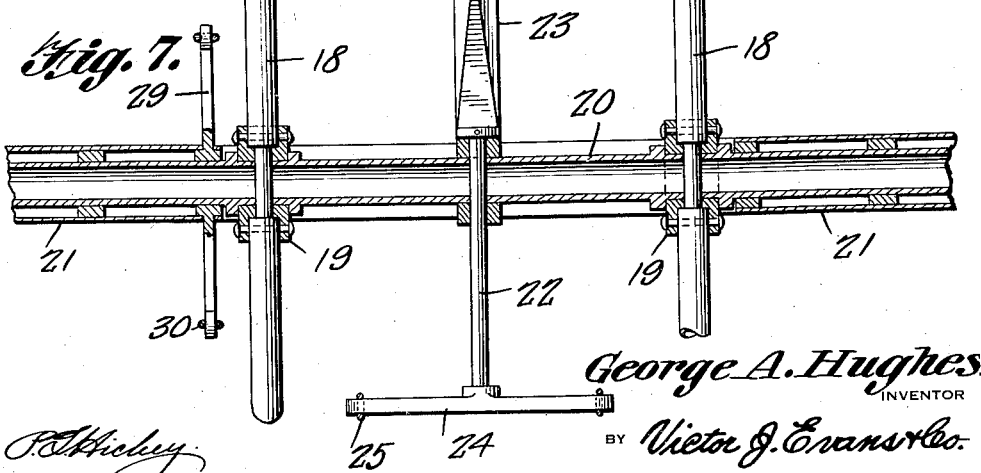
George A. Hughes
INVENTOR
BY Victor J. Evans & Co.
ATTORNEY

UNITED STATES PATENT OFFICE

GEORGE A. HUGHES, OF HAVELOCK, NEBRASKA

AIRPLANE

Application filed January 30, 1932. Serial No. 589,936.

The invention relates to aircraft and more especially to auxiliary airfoil surfaces for airplanes.

The primary object of the invention is the provision of an aircraft or airplane of this character, wherein auxiliary airfoils or balancing planes are adjustably supported and are operative for adjustment at the right or left of the machine, the elevators, rudder and engine controls as well as the airfoils or balancing planes being located in convenient reach and independently controllable by an operator of the machine.

Another object of the invention is the provision of an aircraft or airplane of this character, wherein the main planes are disposed in a particular manner, namely, in upwardly divergent relation to each other at opposite sides of the fuselage, while between these planes are the auxiliary airfoils or balancing planes, the main planes being stationary while the airfoils or balancing planes are adjustable so that the ascent and descent of the machine is readily and conveniently controllable and also efficiency of the flight of such machine assured.

A further object of the invention is the provision of an aircraft or airplane of this character wherein the mounting of the elevator wings and the rudder is novel in form and the same readily controlled as well as the auxiliary airfoils or balancing planes.

A further object of the invention is the provision of an aircraft or airplane of this character, wherein the assembly of the planes or wings is such to increase the strength value and also to improve the flight of the machine and to absorb compression strain transmitted from the airfoils through the wing strut, the machine in its entirety being of novel construction.

A still further object of the invention is the provision of an aircraft or airplane of this character which is comparatively simple in construction, thoroughly reliable and efficient in its purposes, strong, durable, readily and easily operated and under perfect control when in flight with dispatch, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 2 is a top plan view thereof.

Figure 5 is a sectional view on the line 5—5 of Figure 2 looking in the direction of the arrows.

Figure 6 is a sectional view on the line 6—6 of Figure 2 looking in the direction of the arrows.

Figure 7 is a fragmentary sectional view on the line 7—7 of Figure 6 looking in the direction of the arrows.

Similar reference characters indicate corresponding parts throughout the several views in the drawings.

Figure 1:
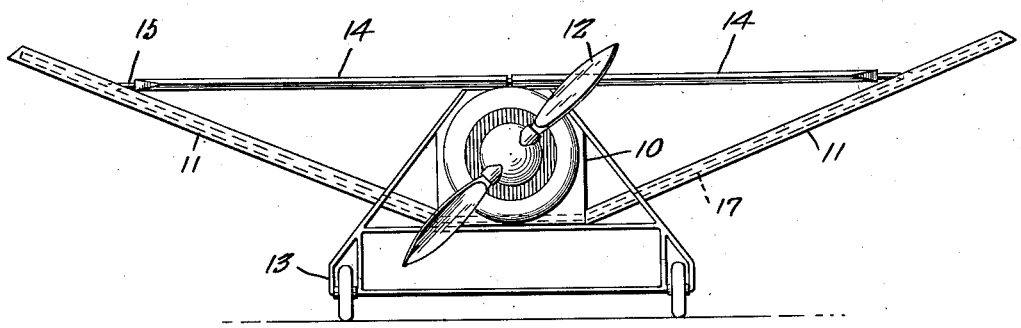
Figure 1 is a front elevation of an aircraft or airplane constructed in accordance with the invention.
Figure 3:
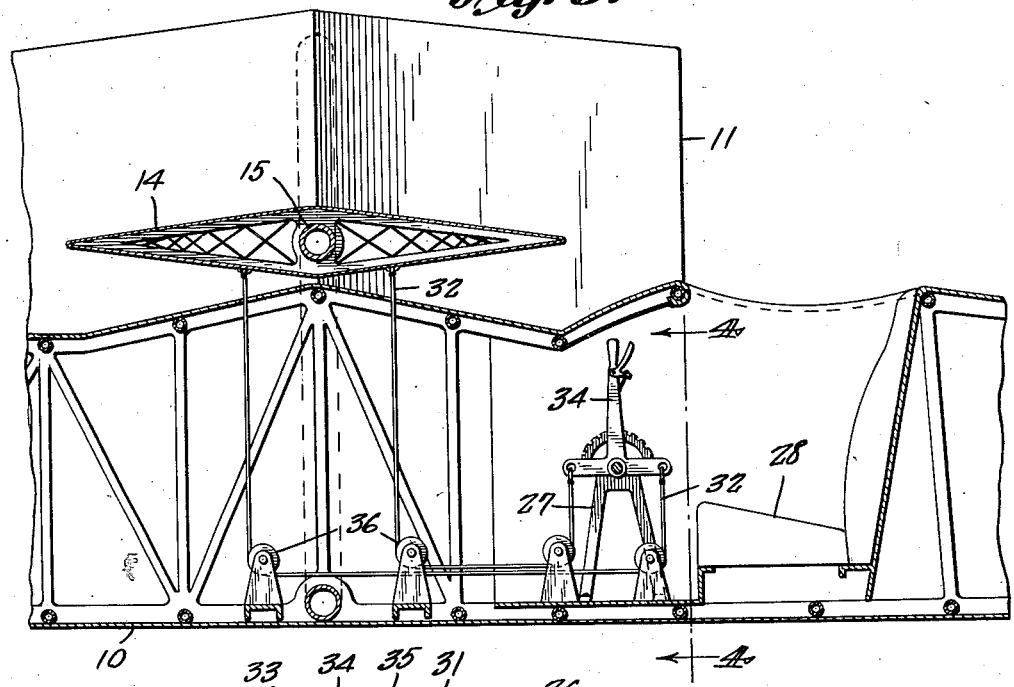
Figure 3 is an enlarged fragmentary sectional view on the line 3—3 of Figure 2 looking in the direction of the arrows.
Figure 4:
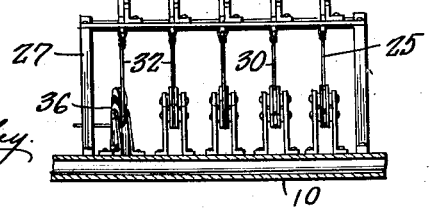
Figure 4 is a sectional view on the line 4—4 of Figure 3 looking in the direction of the arrows.

Referring to the drawings in detail, which disclose the preferred embodiment of the invention, the same includes a fuselage 10 of the wide Burnelli type as shown in Figures 1 and 2 and therewith is associated the main wing extending laterally from its lower portion in the form of oppositely disposed upwardly divergent airfoils 11 to effect the aircraft or airplane known as a "low wing" monoplane. The aircraft or airplane thus disclosed is provided with a power source connected with a propeller 12 of the nose pull type, it being understood of course that there may be one or more and of any standard type. It is also to be clear that the aircraft or airplane of this invention will be provided with suitable landing gear according to the medium from which it is to be flown, either a landing gear 13 or pontoons (not shown).

Arranged between the main wing or airfoils 11 constituted thereby are auxiliary right and left hand airfoils or wings 14, these being disposed in a horizontal plane and in cross section are outwardly tapered to the lead and heel edges thereof. The airfoils or wings 14 are carried at their longitudinal medians upon a stationary pintle or shaft 15, the same having each end fixed in a substantially inverted Y-shaped coupling or union 16 which is joined with a strut or brace 17 of the main wing of the aircraft or airplane. The airfoils or wings 14 are swingingly supported upon this pintle or shaft 15 which is held stationary as before described. The outer ends of the airfoils or wings 14 are substantially V-shaped as at 15 so as not to be interfered with on the swinging thereof in a vertical direction by the main wing of the machine.

Formed at the aft end of the fuselage 10 are rearwardly extending spaced parallel matched open tail frames 18 which through the medium of brackets 19, support medially with respect thereto a transverse shaft 20 which has its ends projected laterally beyond the outer sides of the frames 18 and upon which is journaled a horizontally disposed vertically swinging elevator wing 21, while vertically journaled medially between the frames 18 in the shaft 20 is a rudder stem 22 of a vertical rudder 23.

Carried at the lower end of the stem 22 is a cross piece 24 constituting a double arm lever and with the ends are joined the control cable 25, the same being guided over suitable pulleys interiorly of the fuselage 10 and connected with an operating lever 26 which is manually controlled and disposed in a stand 27 forwardly of the seat 28 to be occupied by the operator of the aircraft or airplane.

The elevator wing 21 has fitted therein a double arm 29 with which is connected a control cable 30, the same connected with and suitably guided to an operating lever 31 located next to and at one side of the lever 26.

The auxiliary airfoils or wings 14 have connected therewith independently operable control cables 32, these being connected to and operated by the control levers 33 and 34 respectively, one actuating the right hand airfoil or wing 14 and the other actuating the left hand airfoil or wing 14, these levers 33 and 34 respectively being located common to the levers 26 and 31, while the power source of the aircraft or airplane has arranged in this group of levers the throttle control lever 35, the cables 32 for the airfoils or wings 14 being suitably trained over guide pulleys 36 interiorly of the fuselage 10 of said aircraft or airplane.

Thus it will be seen that an operator of the aircraft or airplane when within the seat 28 has convenient access to and easy grasp of the group of levers for the control of the auxiliary airfoils or wings 14, elevator 21 and rudder 23.

The elevator 21 and rudder 23 in their cross sectional shape correspond identically with the cross sectional shape of the auxiliary airfoils or wings 14, that is to say, they taper outwardly from the lead to the heel edges thereof.

From the foregoing it is thought that the construction and manner of operation of the aircraft or airplane will be clearly understood and therefore a more extended explanation has been omitted.

What is claimed is:—

1. In an aircraft of the character described, a fuselage, main airfoils disposed at opposite sides of the fuselage in upwardly divergent relation to each other, auxiliary vertically swinging airfoils located between the main airfoils and disposed in a horizontal plane, a shaft supporting the auxiliary airfoils and joined with struts of the main airfoils, means for adjusting the auxiliary airfoils independently of each other, spaced parallel tail frames on the aft of the fuselage, a horizontal shaft mounted medially of said frames, a vertically swinging elevator on said shaft, and a rudder adjustably supported by said shaft medially between the tail frames.

2. In an aircraft of the character described, a fuselage, main airfoils disposed at opposite sides of the fuselage in upwardly divergent relation to each other, auxiliary vertically swinging airfoils located between the main airfoils and disposed in a horizontal plane, a shaft supporting the auxiliary airfoils and joined with struts of the main airfoils, means for adjusting the auxiliary airfoils independently of each other, spaced parallel tail frames on the aft of the fuselage, a horizontal shaft mounted medially of said frames, a vertically swinging elevator on said shaft, a rudder adjustably supported by said shaft medially between the tail frames, and means for adjusting the elevators.

3. In an aircraft of the character described, a fuselage, main airfoils disposed at opposite sides of the fuselage in upwardly divergent relation to each other, auxiliary vertically swinging airfoils located between the main airfoils and disposed in a horizontal plane, a shaft supporting the auxiliary airfoils and joined with struts of the main airfoils, means for adjusting the auxiliary airfoils independently of each other, spaced parallel tail frames on the aft of the fuselage, a horizontal shaft mounted medially of said frames, a vertically swinging elevator on said shaft, a rudder adjustably supported by said shaft medially between the tail frames, means for adjusting the elevators, and means for adjusting the rudder.

4. In an aircraft of the character described, a fuselage, main airfoils disposed at opposite sides of the fuselage in upwardly divergent relation to each other, auxiliary vertically swinging airfoils located between the main airfoils and disposed in a horizontal plane, a shaft supporting the auxiliary airfoils and joined with struts of the main airfoils, means for adjusting the auxiliary airfoils independently of each other, spaced parallel tail frames on the aft of the fuselage, a horizontal shaft mounted medially of said frames, a vertically swinging elevator on said shaft, a rudder adjustably supported by said shaft medially between the tail frames, means for adjusting the elevators, and means for adjusting the rudder, said auxiliary airfoils, elevator and rudder being reversely outwardly tapered in cross section to the lead and heel edges thereof.

In testimony whereof I affix my signature.

GEORGE A. HUGHES.